United States Patent Office 3,120,498
Patented Feb. 4, 1964

3,120,498
PROCESS FOR STABILIZING NATURAL AND SYNTHETIC RUBBER FOAMS
Georg Matthaeus, Cologne-Flittard, Mathieu Quaedvlieg, Leverkusen-Bayerwerk, Werner Theuer, Leverkusen, Gustav Sinn, Bergisch-Neukirchen, and Walter Hagge, Leverkusen, Germany, assignors to Farbenfabriken Bayer Aktiengesellschaft, Leverkusen, Germany, a corporation of Germany
No Drawing. Filed Dec. 29, 1959, Ser. No. 862,458
Claims priority, application Germany Jan. 5, 1959
1 Claim. (Cl. 260—2.5)

This invention relates to the stabilization of latex foams. It is known that foam rubber can be produced by adding hydrogen peroxide and catalysts which are capable of splitting off oxygen to the latex. A suitable catalyst is yeast. The hydrogen peroxide already splits off oxygen at room temperature, and this oxygen expands the latex to form a foam. In order to produce a stable and rigid foam it is necessary to add foam stabilizers to the latex or to its vulcanizable mixture. These foam stabilizers may be of soap-like nature. Coagulation of the foam is effected by freezing the foam at a temperature of from $-10$ to $-30°$ C. If desired carbon dioxide may be blown through the frozen foam. In this way, an irreversible coagulation of the foam takes place. The coagulated foam is then heated to the vulcanizing temperature of $100-120°$ C. Vulcanization takes place at this temperature within 20–40 minutes, depending on the nature of the vulcanization accelerator employed. The difficulty in this process is to prevent the foam collapsing during the relatively slow freezing process which proceeds inwardly. When using the conventional foam stabilizers, such as soaps, for example sodium oleate, sodium ricinoleate, potassium stearate and the corresponding ammonium salts or synthetic soaps, such as alkyl aryl sulphonates, alkyl sulphonates and the like, a partial collapse of the foam occurs, usually internally thereof, because of the poor cold-stabilizing action of these stabilizers during the freezing process, whereby an irregular and non-homogeneous structure is obtained in the foam rubber vulcanizate.

It has now been found that fatty acid esters and carbamic acid esters of disaccharides and oligosaccharides are very suitable for stabilizing latex foams of natural and synthetic rubber. They prevent collapse of the foam during the freezing process which gradually takes place from the surface inwards and foams of uniform and homogeneous pore structure are obtained by the employment of these compounds, even when the freezing process takes place slowly.

Suitable sugar fatty acid esters are for example saccharose laurate, saccharose monopalmitate, saccharosemonomyristate, raffinose-monolaurate, raffinose-myristate and others. Especially suitable are fatty acids containing from 8 to 20 carbon atoms, preferably from 12 to 16 carbon atoms. Examples of the carbamic acid esters are saccharose dodecyl, saccharose cetyl, saccharose myristyl, raffinose dodecyl and raffinose myristyl carbamic acid ester. These compounds are described in German patent specification No. 1,046,010 and can be obtained for example by the process disclosed therein, for example by reacting saccharose with an alkyl isocyanate. The alkyl groups of the isocyanates preferably contain from 8 to 20 carbon atoms.

The compounds employed according to the invention are added to the latices in the usual quantities for stabilizers, for example in an amount of from 0.5 to 1.5% by weight and preferably in an amount of from 0.8 to 1.0% by weight based on the dry rubber substance.

Apart from latices of natural rubber, it is also possible to use latices of synthetic rubber-like polymers, such as those obtained from conjugated diolefines, such as butadiene, dimethyl butadiene, isoprene and their homologues and co-polymers of such conjugated diolefines with polymerizable vinyl compounds, such as styrene, $\alpha$-methyl styrene and their substitution products, acrylonitrile, methacrylonitrile and similar polymers or copolymers which are obtained from isoolefines, such as isobutylene and its homologues, if desired with small quantities of conjugated diolefines. Also suitable are the latices of polymers obtained from chlorobutadiene or its co-polymers with monoolefines and/or diolefines or polymerizable vinyl compounds. These latices may contain in addition conventional additives, such as fillers. The parts and percentages given in the following examples are by weight if not otherwise stated.

Example 1

(a) A latex mixture is prepared having the following composition:
100.0 parts of dry rubber substance=167.0 parts of 60% latex
5.0 parts of zinc oxide
2.0 parts of sulphur
1.0 part of zinc diethyl dithiocarbamate
0.8 part of dihydroxydiphenyl
8.8 parts of a 5% aqueous solution of a condensation product of sodium naphthalene sulphonate and formaldehyde.

From 6 to 12 parts of a 10% aqueous solution of saccharose monolaurate, from 0.5 to 1 part of yeast in the form of a 10% suspension in water and from 50 to 80 parts of a 10% hydroperoxide solution are added to the aforementioned latex mixture. Immediately after adding the hydroperoxide, the latex mixture is introduced into a mould, in which the formation of the foam takes place due to the splitting off of oxygen from the hydroperoxide solution. The foam in the mould is cooled from $-10$ to $-30°$ C. During the cooling process, there is no breaking down of the foam, such as that which is observed when using conventional foam stabilizers such as soaps. The foam coagulates homogeneously throughout. It is heated and vulcanized in the usual manner.

(b) Instead of saccharose monolaurate, it is also possible to use the same quantity of saccharose myristate or the reaction product of lauric acid triglyceride with saccharose or raffinose.

(c) Instead of saccharose monolaurate, it is also possible to use the reaction product of saccharose with dilauroyl glycol ester.

Example 2

(a) A latex mixture is prepared having the following composition:
100.0 parts of dry rubber substance=167.0 parts of 60% latex
5.0 parts of zinc oxide
2.0 parts of sulphur
1.0 part of zinc diethyl dithiocarbamate
0.8 part of dihydroxydiphenyl
8.8 parts of a 5% aqueous solution of a condensation product of sodium naphthalene sulphonate and formaldehyde.

From 6 to 12 parts of a 10% aqueous solution of saccharose lauroyl carbamic acid ester, from 0.5 to 1 part of yeast in the form of a 10% suspension in water and from 50 to 80 parts of a 10% hydroperoxide solution are added to the aforementioned latex mixture. Immediately after adding the hydroperoxide, the latex mixture is introduced into a mould, in which the formation of the foam takes place due to the splitting off of oxygen from the hydroperoxide solution. The foam in the mould is cooled to from $-10$ to $-30°$ C. During the cooling process, there is no breaking down of the foam, such as that which is observed when using conventional foam stabilizers, such as soaps. The foam coagulates homogeneously throughout. It is heated and vulcanized in the usual manner.

(b) Instead of saccharose lauroyl carbamic acid ester, it is also possible to use the same quantity of saccharose myristyl carbamic acid ester.

We claim:

In a process wherein a member selected from the group consisting of a natural rubber latex foam and a butadiene polymer latex foam is coagulated by freezing and is subsequently vulcanized, the improvement comprising preventing the foam from collapsing during freezing by incorporating in the latex prior to foaming and freezing a stabilizer selected from the group consisting of saccharose monolaurate, raffinose monolaurate, saccharose monomyristate, and raffinose monomyristate.

References Cited in the file of this patent

UNITED STATES PATENTS

| 2,856,372 | Novak et al. | Oct. 14, 1958 |
| 2,891,017 | Kern | June 16, 1959 |

OTHER REFERENCES

Chemical and Engineering News, June 3, 1957, page 90.

Noller: Chemistry of Organic Compounds, second edition, copyright 1951, W. B. Saunders Company, Philadelphia, Pa., page 359.